3,595,885
ORGANOPOLYSILOXANES AND THE PROCESS
FOR THEIR PREPARATION
Gerd Rossmy, Essen-Werden, and Gotz Koerner, Mulheim
(Ruhr), Germany, assignors to Th. Goldschmidt A.G.,
Essen, Germany
No Drawing. Continuation-in-part of abandoned application Ser. No. 431,448, Feb. 9, 1965. This application Nov. 26, 1968, Ser. No. 779,209
Claims priority, application Germany, Feb. 12, 1964,
P 14 95 961.6
Int. Cl. C09f 5/08; C07f 7/08, 7/18
U.S. Cl. 260—398R                                   15 Claims

ABSTRACT OF THE DISCLOSURE

An equilibrated mixture of compounds of the average formula $$R_xSiO_y(SO_4)_zX_{4-(x+2y+2z)}$$

wherein R is a member selected from the group consisting of alkyl of from 1 to 6 carbon atoms, chloropropyl, vinyl, allyl, benzyl, phenyl and chlorophenyl;

Ac is acyl derived from a carboxylic acid of not more than 2 carboxylic groups and selected from the group consisting of mono- and dibasic aliphatic saturated carboxylic acids, mono- and dibasic aliphatic unsaturated carboxylic acids, mono- and dibasic aromatic carboxylic acids, chloroacetic acid, thioglycolic acid and anthranilic acid, $x$ and $y$ being defined by $$x = 1.01-2.1$$
$$y = 0.5-1.3 \text{ and}$$
$$4 > (x+2y) > 2$$

A process of preparing the equilibrated mixture is also disclosed. Organopolysiloxanes of the general formula $$R_xSiO_y(SO_4)_zX_{4-(x+2y+2z)}$$

wherein R, $x$ and $y$ have the above meaning, X is halogen and $z = 0.0001-0.2$, are reacted with (a) carboxylic acid, (b) carboxylic acid salts, (c) anhydride of carboxylic acid or mixtures of (a), (b) and (c).

CROSS-REFERENCE TO PRIOR APPLICATIONS

This is a continuation-in-part of application Ser. No. 431,448 filed Feb. 9, 1965, now abandoned.

SUMMARY OF THE INVENTION

This invention generally relates to organosilicon compounds and is particularly directed to novel organopolysiloxanes and a process for their preparation.

U.S. Pat. No. 3,183,254 discloses and claims equilibrated mixtures of organopolysiloxanes of the general unit Formula I $$R_xSiO_y(SO_4)_zX_{4-(x+2y+2z)} \qquad I$$

In this formula, R may be a monovalent hydrocarbon, for example methyl, which may be present in admixture with other, including substituted, hydrocarbons; X stands for a halogen atom, preferably chlorine. The patent referred to also deals with processes for preparing such equilibrated organopolysiloxane mixtures.

It is a primary object of this invention to prepare novel organopolysiloxanes having terminal acyloxy groups from compounds of Formula I above.

A further object of the invention is to provide novel organopolysiloxanes which are useful for many industrial purposes.

Still another object of this invention is to provide a process for preparing such novel organopolysiloxanes.

Generally, it is an object of this invention to improve on the art of polysiloxanes and processes for their preparation as presently practiced.

Briefly, and in accordance with this invention, the novel organopolysiloxanes of this invention may be represented by equilibrated mixtures of compounds of the average Formula II $$R_xSiO_yOAc_{4-(x+2y)} \qquad II$$

In this formula, R stands for alkyl of from 1 to 6 carbon atoms, chloropropyl, vinyl, allyl, benzyl, phenyl or chlorophenyl;

Ac is acyl derived from a carboxylic acid of not more than two carboxylic groups. Generally, all mono- or dibasic saturated or unsaturated aliphatic or aromatic carboxylic acids, including substituted carboxylic acids, come into consideration. Thus, the acyl may be derived from, for example, formic acid, acetic acid, propionic acid, hexanoic acid, long-chained carboxylic acids, including the fatty acids, as well as chloroacetic acid, acrylic acid, adipic acid, methacrylic acid, fumaric acid, malonic acid, thioglycolic acid, benzoic acid, salicylic acid, isophthalic acid, terephthalic acid and anthranilic acid;

$x$ has a value from 1.0 to 2.1 while $y$ has a value from 0.5 to 1.3 and $4 > (x+2y) > 2$. Preferred values for $x$ and $y$ are 1.85 to 2.0 and 0.95 to 1.15, respectively.

The preferred carboxylic acids are saturated aliphatic monocarboxylic acids, unsaturated aliphatic monocarboxylic acid with one double bond, aliphatic dicarboxylic acids and aromatic dicarboxylic acids.

The inventive novel compounds may also be represented by an equilibrated mixture of compounds of the average formula:

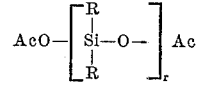

wherein R and Ac have the above-indicated meaning, and $r$ is a number between 3 and 100.

Equilibrated mixtures of compounds of the average formula

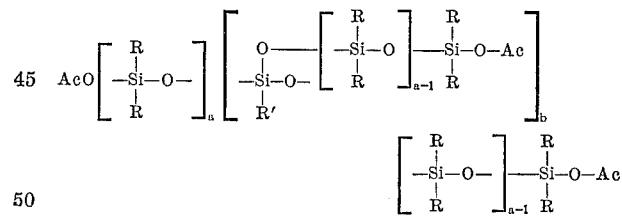

are also embraced by the general Formula II. In this formula, R and Ac have the meaning previously referred to; R' is hydrocarbon, preferably methyl, ethyl, vinyl or phenyl; $a = 1-20$ and $b = 1-20$. Preferred values for $a$ and $b$ are: $a = 3-10$ and $b = 1-5$.

In accordance with the inventive process, the novel organopolysiloxanes with terminal acyloxy groups, including the compounds of the novel equilibrated mixtures, are formed by reacting organopolysiloxanes of Formula I above, to wit, $$R_xSiO_y(SO)_4)_zX_{4-(x+2y+2z)}$$

wherein R and X have the meaning as defined in connection with Formula I;

$x = 1.0-2.1$, preferably 1.85–2.0;
$y = 0.5-1.3$, preferably 0.95–1.15;
$z = 0.0001-0.2$, preferably 0.001–0.1; and
$4 > (x+2y+2z) > 2$
with
(a) a mono- or polybasic carboxylic acid, (b) a salt of such carboxylic acid, or
(c) an anhydride of such carboxylic acid.

Mixtures of (a), (b) and (c) may also be used.

The reaction is preferably carried out at elevated temperature, preferably in the range of 40 to 150° C.

If the reaction is carried out with carboxylic acids proper, as distinguished from their salts or anhydrides, the reaction is facilitated by performing it in the presence of an acid acceptor.

The reaction is advantageously performed in the presence of an invert solvent. This is particularly recommended if the reaction is carried out with salts of carboxylic acids. Methylene chloride, benzene, diethyl ether and ethyl acetate are suitable inert solvents.

As stated above, R may be any monovalent hydrocarbon and is preferably methyl. However, ethyl, chloropropyl, phenyl, benzyl, as well as vinyl and allyl are also suitable.

The value of $z$ is Formula I is dependent on the constitution of the average molecule. The higher the value for $z$, the more rapidly is equilibration of the siloxane achieved and the higher, however, is also the average molecular weight. In the case of branched siloxanes, it is oftentimes advisable to choose a low $z$-value and instead to equilibrate for a longer period. Very high $z$-values should be avoided in order to prevent gel formation.

The choice of the particular carboxylic acid or acids or their derivatives will, of course, be dependent on the desired characteristics of the reaction product to be obtained. Generally speaking, and as stated above, all mono- or polybasic saturated or unsaturated aliphatic or aromatic, including substituted, carboxylic acids come into consideration. Formic acid, acetic acid, long-chained fatty acids, chloroacetic acid, acrylic acid, methacrylic acid, fumaric acid, thioglycolic acid, benzoic acid, salicylic acid, isophthalic acid, terephthalic acid and anthranilic acid and mentioned as suitable examples.

The reaction of the compounds of Formula I with the carboxylic acids results in the formation of hydrogen halide, e.g. HCl if X=Cl. This hydrogen halide may be removed from the reaction mixture by boiling or by suction. According to an alternate procedure, it may be bound by an acid acceptor. Ammonia and amines are suitable acid acceptors for this purpose.

As previously stated, the reaction need not be carried out with carboxylic acid proper, but salts of carboxylic acids may also be considered. The alkali metal-, alkaline earth metal- or ammonium salts of carboxylic acids are particularly suitable for the inventive purpose. If ammonium salts are employed, the ammonium group may be substituted. Upon completion of the reaction, the reaction product may be separated from the salt by any suitable prior art solid-liquid separating procedure.

In the event that anhydrides of the carboxylic acids are used, it is not necessary that the anhydride is derived from a single carboxylic acid. Mixed anhydrides may thus also be reacted in accordance with the inventive process. The acid halide which thus is formed during the reaction is advantageously removed from the reaction solution by distillation, in order to displace the equilibrium in favor of the desired reaction product.

The use of anhydrides or of carboxylic acids proper may result in reaction products which still contain SO$_4$ or —OSO$_3$H bound to silicon.

The inventive process for forming organopolysiloxanes, including the novel organopolysiloxane mixture of Formula II, may be represented by the following reaction formula which illustrates the reaction of a compound of Formula I with an acid or the salt of an acid:

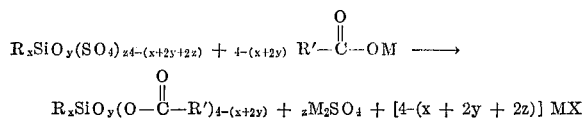

In this formula, R, X, $x$, $y$ and $z$ have the previously indicated meaning; R' is hydrocarbon, which may be substituted. The hydrocarbon group may also be further substituted by additional

groups; M is hydrogen, a metal equivalent of hydrogen as for example Na, K, ½ Ca or ammonium, which latter may be substituted.

The starting compounds of Formula I may, for example, correspond to compounds as represented by Formula III:

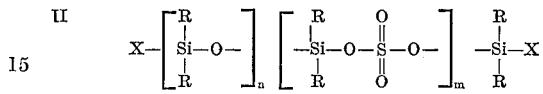

In this formula, R and X have the above-indicated meaning, $n$ has a value of from 3 to 100, preferably from 8 to 30, and $m$ has a value of from 0.01 to 2, preferably from 0.05 to 0.5. It is thus clear that not each molecule has to contain a silylsulfate group. The most suitable value for $m$ should be determined for each individual system while considering the fact that generally higher $m$-values cause more rapid equilibration, but also a higher viscosity of the inventive starting compounds. Other compounds which are embraced by the general average Formula I may be represented by the following Formula IV:

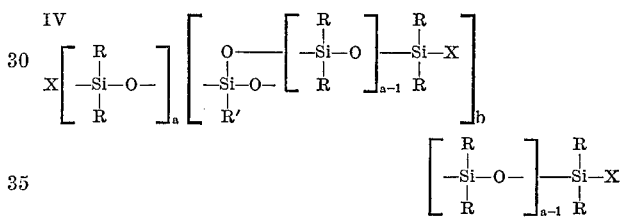

In this formula, R and X have the meanings previously defined. A portion of the X groups, particularly 5 to 40%, is replaced by

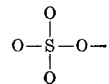

groups, so that one SO$_4$ group replaces two X groups; R' stands for hydrocarbon and is preferably methyl, ethyl, vinyl or phenyl; $a$ has a value of from 1 to 20, preferably 3 to 10; and $b$ has a value of from 1 to 20, preferably 1 to 5. Generally, Formula I also embraces siloxanes which are derived from the compounds of Formula IV, but wherein two Si—X groups are replaced by one Si—O—Si group. Thus, such latter compounds are also embraced by the scope of the starting compounds to be used for the purposes of this invention.

The polysiloxanes prepared in accordance with this invention have within the siloxane skeleton or framework a polymer distribution which is equal to, or almost equal to, the equilibrium. Consequently, the reproducibility of their characteristics is excellent. The compounds may be used for a wide variety of purposes. They thus may be employed for causing cross-linking of silicone resins having reactive terminal groups. They also find use in hydrophobic paper impregnation. For the latter purpose they may be used in conjunction with silicones having end-blocking OH groups. The products of this invention have also proved themselves as hardeners of silicone rubber, particularly of the cold hardening types. Furthermore, the compounds are suitable for the reaction with organic resin components having reactive OH groups. It has been established that the use of the inventive compounds in this manner results in the formation of mixed resins of excellent properties, in which the ratio of the components of the mixture can be readily adjusted. Products which contain groups capable of polymerization, as for example the reaction products of methacrylic acid or fumaric acid or their salts or anhydrides, can be advantageously copolymerized with other unsaturated compounds. In this manner, silicon modified unsaturated polyester resins, polystyrenes and the like compounds may be produced. Reaction products which contain thioglycolic acid find application in hair cosmetics, while products which contain salicylic groups are suitable for use in sun tan oils.

Compounds which upon first glance may seem similar to the inventive compounds have been disclosed in U.S. Pat. 3,183,254 in which the acyloxy groups of the present compounds are comprised instead of alkoxy. It should be emphasized, however, that, in fact, there is no equivalence between the present acyloxy group comprising compounds and the alkoxy compounds of the previous patent referred to since the present compounds are readily split by hydrolysis while no such easy hydrolytic splitting can be effected with the prior art compounds. Due to this difference in susceptibility to hydrolysis, the compounds of the present invention are suitable for uses to which the prior art alkoxy compounds cannot successfully be put. The present acyloxysilicon compounds thus react—even in the absence of catalysts—with hydroxyl groups, e.g. with Si-bonded hydroxyl groups under splitting of free acid and formation of SiOSi-linkages:

$$\equiv SiOAc + HO—Si\equiv \rightarrow \equiv SiOSi\equiv + AcOH$$

The reaction referred to is successfully utilized in the production of single-component casting masses for filling cracks and fissures, so-called cold-hardening silicon rubbers. For this purpose, acyloxypolysiloxane is admixed with polysilanols, an excess of acyloxy groups being present in the mixture. During the mixing, the acyloxy groups react with the Si—OH groups until all the Si—OH groups have been used up. The reaction product thus obtained can be stored for prolonged periods and can be transported at a later time to the place of use. If at such later time the mass is pressed, for example, into a crack of a wall or the like, the remaining acyloxy groups are split off under the action of air moisture and SiOSi bridges are formed, whereby the product hardens to a viscous-elastic mass. The above use of the inventive compound is peculiar to the acyloxy containing compounds and the alkoxy compounds of the prior patent referred to are not suitable for this purpose.

The invention will now be described by several examples, it being understood, however, that these examples are given by way of illustration and not by way of limitation and that many changes may be effected in the choice of raw material and process conditions in general, without affecting in any way the scope and spirit of this invention as recited in the appended claims.

EXAMPLE I

The starting compound for this example was a siloxane corresponding to Formula III, wherein R=CH$_3$, X=Cl, $n$=16.7, $m$=0.103, and acid value=1.595·10$^{-3}$ val. acid per gram. 286.2 g. of this siloxane were added in dropwise manner and under agitation to a suspension of 56.2 g. of anhydrous sodium acetate in 300 ccm. of water-free benzene. The dropwise addition of the siloxane to the suspension was effected at a temperature of 70° C. and within one hour. Upon completion of the addition of the siloxane to the suspension, the reaction mixture thus obtained was allowed to further react for 8 hours at 70° C. The salt thus obtained was removed by suction filtration and was washed several times with benzene. The filtrate was liberated from solvent in vacuum and again filtered. The yield was 288 g. (theoretical amount 296.4 g.). The product was analyzed with the following result:

Acetate groups.—Calculated (percent): 9.08; Found (percent): 8.6. Viscosity: 16.4 cp.

EXAMPLE II

This example was carried out with a siloxane corresponding to Formula IV, wherein R=CH$_3$, X=Cl and SO$_4$/2, $b$=3, $a$=6.5, acid value=1.812·10$^{-3}$ val. acid per gram, 5.055% cl and 1.865% SO$_4$. 300 g. of this siloxane were reacted with 67 g. of anhydrous sodium acetate and 300 ccm. of benzene in the same manner as described in connection with Example I. The yield was 301.3 g. (theoretical amount 311.35 g.). The analysis of the compound showed:

Acetate groups: Calculated (percent): 10.7. Found (percent): 10.3; viscosity: 42 cp.

The obtained product corresponds to Formula IV, wherein $a$, $b$, R and R' have the above-indicated meaning, and

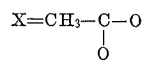

$$X=CH_3—C—O$$
$$\phantom{X=CH_3—C}\|$$
$$\phantom{X=CH_3—C—}O$$

EXAMPLE III 18.6 g. (0.15 mole) of potassium methacrylate were mixed with a small amount of hydroquinone and were dried with benzene by azeotropic distillation in such a manner that a suspension of potassium methacrylate in 80 ccm. of benzene was formed. Thereafter, 30.1 g. (0.1 acid equivalent) of a siloxane of Formula III were added to the suspension in dropwise manner and the mixture thus obtained was agitated for 10 hours at 80° C. In the siloxane of Formula III, R=CH$_3$, X=Cl, $n$=7.4256, and $m$=0.1726. The cooled reaction product was then filtered, the residue was washed with benzene, and the benzene was finally removed by distillation in vacuum. 32 g. (92% of the theoretical amount) of a substance remained which did not contain any chlorine and which had an acid value of 2.5·10$^{-3}$ val. acid per g. (theoretical value 2.87·10$^{-3}$ val. acid per g.) The product corresponds to the formula:

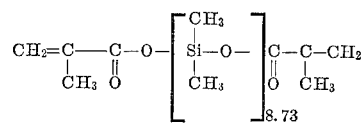

EXAMPLE IV

This example was carried out with an equilibrated siloxane of the average formula

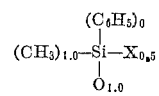

wherein 77.5 mole percent of X were Cl while 22.5 mole percent were SO$_4$/2. The equilibrated siloxane was prepared by hydrolysis of an equimolecular mixture of dimethyldichlorosilane and phenyltrichlorosilane in ether with a corresponding amount of water and sulfuric acid. The ether was removed by distillation at the end of the hydrolysis. 116.8 g. (1 mole Si) of the remaining liquid product were dissolved in 110 ccm. of benzene and the solution was added to a suspension consisting of 123 g. (1.5 mole) of anhydrous sodium acetate in 110 ccm. of benzene. The mixture thus obtained was agitated for thirty hours at 70° C., was cooled down to room temperature and thereafter filtered. The benzene was removed by distilaltion in vacuum.

Yield: 122 g. (96% of the theoretical amount) acid value (determined as a saponification number);
Found: 3.81·10$^{-3}$ val. acid per g.;
Theoretical: 3.93·10$^{-3}$ val. acid per g.;
The chlorine value is below 0.5%.

EXAMPLE V

The starting compound for this example was a siloxane corresponding to Formula III, wherein R=CH$_3$, X=Cl, $n$=7.4256, $m$=0.1726. 30.1 g. of this siloxane (0.1 acid equivalent) were admixed with 12.1 g. (0.12 mole) of triethylamine, a small amount of hydroquinone and 80 ccm. benzol. 8.64 g. (0.12 mole) of anhydrous stabilized acrylic acid were added in dropwise manner and under agitation to the above mixture. This addition was effected at room temperature and within 45 minutes. The product rested for a night and was then filtered, afterwards the residue was washed with benzene. The total chlorine and SO₄ of the siloxane was recovered in the washed salt. The filtrate was liberated from solvent in vacuum. The yield was 31.1 g. (93% of the theoretical amount). The product had an acid value of $2.73 \cdot 10^{-3}$ val. acid per gram (theoretical value $2.99 \cdot 10^{-3}$ val. acid per g.). The product corresponds to the formula:

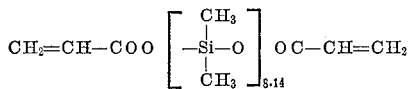

EXAMPLE VI 16.1 g. (0.11 mole) of anhydrous adipic acid were dissolved in 200 ccm. benzene. At a temperature of 70° C., 60.2 g. (0.2 acid equivalents) of a siloxane of Example V were dropwise added. The addition was effected under agitation within 2 hours. Then within a 30-minute time period, 25 g. triethylamine (0.25 mole) were also added under agitation. The reaction mixture thus obtained was allowed to further react for 20 hours at a temperature of 70° C. The salt thus obtained was removed by suction filtration and was washed several times with benzene. The filtrate was liberated from solvent in vacuum. The yield was 63.9 g. (95.2% of the theoretical amount) of a product of high viscosity. The product had an acid value of $2.95 \cdot 10^{-3}$ val. acid per gram (theoretical value $2.92 \cdot 10^{-3}$ val. acid per g.). The chlorine value was $0.7 \cdot 10^{-5}$ val. chlorine per gram. The reaction was nearly effected quantitatively. The product corresponds to the formula:

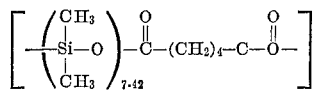

By increasing the amount of adipic acid in the reaction mixture, no formation of monoester takes place but the diester of adipic acid is formed instead in quantitative manner. The remaining excess adipic acid remains in the reaction mixture in unreacted form.

EXAMPLE VII

Example VI was repeated, only instead of adipic acid 12.8 g. (10.11 mole) anhydrous stabilized fumaric acid were used. Yield: 59 g. (92% of the theoretical amount) of an adhesive product having a very high viscosity. Acid value: $3.09 \cdot 10^{-3}$ val. acid per gram (theoretical value 3.12 val. acid per gram). Chlorine content: $2.1 \cdot 10^{-5}$ val. chlorine per gram. Also in this case the reaction was nearly quantitative. The product corresponds to the formula:

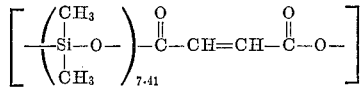

EXAMPLE VIII 110.8 g. of a siloxane of the Formula IV (R=CH₃, X=Cl and SO₄/2, $a=6.4$, $b=2$, acid value $1.805 \cdot 10^{-3}$ val./g.) were added to a suspension of 17.0 g. of anhydrous sodium formate in 200 ml. of waterfree benzene. The mixture was stirred for 30 hours under reflux. After cooling, the mixture was subjected to filtration. The benzene was removed from the filtrate by distillation at 70° C. and under a pressure of 17 mm. Hg.

The yield was 103 g. The theoretical yield would be 112.7 g. The viscosity was 25.1 cp./20° C.

ANALYSIS

| | Calculated | Found |
|---|---|---|
| Formyloxy groups (val./g.) | $1.774 \cdot 10^{-3}$ | $1.693 \cdot 10^{-3}$ |
| Chlorine, percent | | 0.6 |
| Silicon, percent | 33.13 | 32.9 |

EXAMPLE IX 330 g. of a siloxane of the Formula IV (R=CH₃, X=Cl and SO₄/2, $a=1.5$, $b=1$, acid value $6.06 \cdot 10^{-3}$ val./g.) were added to a suspension of 205 g. (2.5 mole) of anhydrous sodium acetate in 350 ml. of dry benzene. After heating under reflux for five hours, the liquid phase was free of chlorine. The reaction mixture was then filtered and the filtrate was liberated from benzene by distillation at 70° C. and under a pressure of 17 mm. Hg. The residue was a light yellow liquid.

Yield: 361.2 g. (theoretical yield: 377.5 g.). Viscosity: 7.1 cp./20° C.

ANALYSIS

| | Calculated | Found |
|---|---|---|
| Acetoxy groups (val./g.) | $5.305 \cdot 10^{-3}$ | $4.83 \cdot 10^{-3}$ |
| Silicon, percent | 27.88 | 27.9 |

10 parts by weight of this product were mixed with 90 parts by weight of a linear dimethyl polysiloxane with terminal hydroxy groups (viscosity: 18,000 cp.). The mixture thus obtained was divided into two portions of substantially equal weight and one of the portions was admixed with 2% by weight of dibutyl-tin-laurate as catalyst. By subjecting the two portions, to wit both the catalyst-containing portions and the catalyst-free portion, to air moisture, condensation of the mixture to an elastomeric mass took place. This reaction, however, did not take place in the absence of air moisture and both portions remained liquid.

A comparison test was carried out with the corresponding ethoxy siloxane, to wit, the acetoxy siloxane was replaced by ethoxy siloxane. The comparison test showed that the catalyst-containing mixtures reacted in the presence of moisture with a substantial viscosity increase. This phenomenon occurred both in the absence and in the presence of air. By contrast, the viscosity of the portions free of catalysts increased negligibly only, irrespective of the presence or absence of air.

EXAMPLE X 212.8 g. of siloxane of the Formula IV (R=methyl, X=Cl and SO₄/2, $a=2$, $b=2$, acid value $4.705 \cdot 10^{-3}$ val./g.) were mixed with 111.3 g. of triethylamine.

A water-free mixture consisting of 81.5 g. of propionic acid and 550 ml. of benzene were added in dropwise manner and under agitation during a period of 45 minutes. This resulted in the occurrence of an exothermic reaction. The reaction was continued under stirring for five hours at room temperature and subsequently for three hours at a temperature of 70° C. The cooled mixture was then filtered and the filtrate was liberated from benzene at 50° C. and at a pressure of 17 mm. Hg.

The distillation residue contained small amounts of triethylammonium propionate. In order to separate this contamination, the distillation residue was admixed with 50 grams of kieselguhr. The distillation residue was subsequently filtered.

Yield: 253.6 g. (theoretical yield: 290.95 g.).

ANALYSIS

| | Calculated | Found |
|---|---|---|
| Contents of acyl groups in val./g. | $3.94 \cdot 10^{-3}$ | $3.82 \cdot 10^{-3}$ |
| Chlorine, percent | | <0.1 |
| Silicon, percent | 28.43 | 28.4 |

EXAMPLE IX

Conforming to Example X, 249.3 g. of a siloxane of the Formula IV (R=CH₃, X=Cl and SO₄/2, $a=6.4$, $b=2$, acid value $1.805 \cdot 10^{-3}$ val./g.) were reacted with 58.08 grams of hexanoic acid and 55.7 g. of triethylamine.

Yield: 237.9 g. (theoretical yield: 257.8 g.) Viscosity: 34.1 cp./20° C.

ANALYSIS

| | Calculated | Found |
|---|---|---|
| Content of acyl groups in val./g. | $1.613 \cdot 10^{-3}$ | $1.577 \cdot 10^{-3}$ |
| Chlorine, percent | | $<0.1$ |
| Silicon, percent | 29.46 | 29.1 |

EXAMPLE XII

A suspension of 76.5 g. of sodium stearate in 600 ml. toluene was dehydrated by removing 150 ml. of toluene by distillation. The mixture was then admixed with 110.7 g. of a siloxane of the Formula IV ($R=CH_3$, $X=Cl$ and $SO_4/2$, $a=6.4$, $b=2$, acid value $1.805 \cdot 10^{-3}$ val./g.). The reaction mixture thus obtained was agitated for 10 hours under weak reflux. After filtration and removal of the solvent, the distillation residue was subjected to filtration.

Yield: 142 g. (theoretical yield: 160.4 g.). Viscosity: 28 cp./20° C.

ANALYSIS

| | Calculated | Found |
|---|---|---|
| Content of acyl groups in val./g. | $1.248 \cdot 10^{-3}$ | $1.311 \cdot 10^{-3}$ |
| Chlorine, percent | | $<0.1$ |
| Silicon, percent | 23.29 | 23.0 |

A comparison of this acyloxypolysiloxane, obtained by the reaction with sodium stearate, with a corresponding alkoxypolysiloxane obtained by reaction with setaryalcohol showed the following: The acyloxysiloxane hydrolyses upon access of air moisture while the corresponding alkoxysiloxane does not hydrolyze under such conditions.

EXAMPLE XIII 43.9 g. of methacrylic acid, stabilized with 2% of hydrochinone, were added, under stirring and in dropwise manner, during a period of 1 hour to a mixture consisting of 249.3 grams of a siloxane of the Formula IV ($R=CH_3$, $X=Cl$ and $SO_4/2$, $a=6.4$, $b=2$, acid value $1.805 \cdot 10^{-3}$ val./g.), 400 ml. of benzene and 55.7 g. of triethylamine. By means of water cooling, the reaction temperature was maintained at 25° C. The reaction mixture was subjected to filtration after 15 hours. The filtrate was admixed with 0.2 g. of hydrochinone. Subsequently, the benzene was removed by distillation at 30° C. and under reduced pressure. 50 g. of kieselguhr were added to the distillation residue in order to absorb contaminants. Filtration was subsequently effected.

Yield: 230 g. (theoretical yield: 274 g.). Viscosity: 48.3 cp./20° C.

ANALYSIS

| | Calculated | Found |
|---|---|---|
| Acid value, val./g. | $1.658 \cdot 10^{-3}$ | $1.591 \cdot 10^{-3}$ |
| Chlorine, percent | | $<0.1$ |
| Silicon, percent | 30.93 | 30.8 |

The siloxane of this example was correspondingly reacted with acrylic acid.

Viscosity: 34.8 cp./20° C.

ANALYSIS

| | Calculated | Found |
|---|---|---|
| Acid value, val./g. | $1.696 \cdot 10^{-3}$ | $1.675 \cdot 10^{-3}$ |
| Chlorine, percent | | $<0.1$ |
| Silicon, percent | 31.67 | 31.5 |

The compounds, produced according to Examples VIII through XIII, correspond to the general Formula IV, wherein the groups and indices have the following meaning:

FORMULA IV

Example 8........ $R=CH_3$   $a=6.4$   $b=2$   $X=-O\overset{\overset{O}{\|}}{C}H$ Example 9........ $R=CH_3$   $a=1.5$   $b=1$   $X=-O\overset{\overset{O}{\|}}{C}CH_3$ Example 10....... $R=CH_3$   $a=2$   $b=2$   $X=-O\overset{\overset{O}{\|}}{C}\cdot CH_2\cdot CH_3$ Example 11....... $R=CH_3$   $a=6.4$   $b=2$   $X=-O\overset{\overset{O}{\|}}{C}\cdot (CH_2)_4 CH_3$ Example 12....... $R=CH_3$   $a=6.4$   $b=2$   $X=-O\overset{\overset{O}{\|}}{C}\cdot (CH_2)_{16} CH_3$ Example 13.......
$\begin{cases} R=CH_3 \quad a=6.4 \quad b=2 \quad X=-O\overset{\overset{O}{\|}}{C}\cdot \underset{CH_3}{C}=CH_2 \\ R=CH_3 \quad a=6.4 \quad b=2 \quad X=-O\overset{\overset{O}{\|}}{C}\cdot CH=CH_2 \end{cases}$

EXAMPLE XIV

Within a period of 2 hours and under agitation, 89.2 g. of a siloxane of the Formula III ($R=CH_3$, $X=Cl$, $n=4.18$, $m=0.09$, acid value $4.49 \cdot 10^{-3}$ val./g.) were added in a dropwise manner to a mixture of 22.9 g. (0.22 mole) of malonic acid and 400 ml. of anhydrous benzene. During an additional period of 30 minutes, 39.6 g. (0.5 mole) of pyridine were added to the mixture under agitation. After stirring for 20 hours, the reaction mixture was subjected to filtration at 70° C. The filtrate consisted of two liquid phases. The upper phase contained the desired compound. After separation in a separating funnel, the benzene was removed by distillation at 40 to 50° C. and 17 mm. Hg. The residue was a clear viscous liquid.

Yield: 89.6 g. (theoretical yield: 95.3 g.).

ANALYSIS

| | Calculated | Found |
|---|---|---|
| Acyl groups (val./g.) | $4.19 \cdot 10^{-3}$ | $4.13 \cdot 10^{-}$ |
| Chlorine, percent | | $<0.1$ |
| Silicon, percent | 33.86 | 33.2 |

The compound corresponds to the formula:

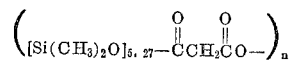

EXAMPLE XV

Within two hours and under agitation, 89.2 g. of a siloxane of the Formula III ($R=CH_3$, $X=Cl$, $n=4.18$, $m=0.09$, acid value of $4.49 \cdot 10^{-3}$ val./g.) were added in dropwise manner to a mixture of 36.5 g. (0.22 mole) of terephthalic acid and 400 ml. of anhydrous benzene. During an additional time period of 20 minutes, 39.6 g. (0.5 mole) of pyridine were added under agitation. After stirring for 20 hours at a temperature of 70° C., the reaction mixture was filtered. The filtrate was liberated from benzene and pyridine at a temperature of 60° C. and at 17 mm. Hg. The reaction product was a highly viscous liquid.

Yield: 96.5 g. (theoretical yield: 107.8 g.).

ANALYSIS

| | Calculated | Found |
|---|---|---|
| Acyl groups (val./g.) | $3.71 \cdot 10^{-3}$ | $3.43 \cdot 10^{-3}$ |
| Chlorine, percent | | $<0.1$ |
| Silicon, percent | 27.47 | 25.9 |

The compound corresponds to the formula:

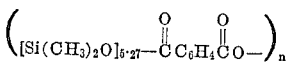

What is claimed is:

1. A process of preparing organopolysiloxanes having terminal acyloxy groups, which comprises reacting organopolysiloxanes of the general formula $$R_xSiO_y(SO_4)_zX_{4-(x+2y+2z)}$$

wherein
R is hydrocarbon,
X is halogen,
$x = 1.0$—2.1,
$y = 0.5$—1.3,
$z = 0.0001$—0.2, and
$4 > (x+2y+2z) > 2$, with a member selected from the group consisting of
(a) carboxylic acids,
(b) carboxylic acid salts,
(c) an anhydride of carboxylic acids, and
(d) mixtures of (a), (b) and (c), said carboxylic acids being selected from the group consisting of mono- and dibasic aliphatic saturated carboxylic acids, mono- and dibasic aliphatic unsaturated carboxylic acids, mono- and dibasic aromatic carboxylic acids, chloroacetic acid, thioglycolic acid and anthranilic acid.

2. A process as claimed in claim 1, wherein the reaction is carried out at elevated temperature in a range of about between 40 to 150° C.

3. A process ts claimed in claim 1, wherein the reaction is carried out in the presence of an inert solvent.

4. A process of preparing organopolysiloxanes having terminal acyloxy groups, which comprises reacting organopolysiloxanes of the general formula $$R_zSiO_y(SO_4)_zX_{4-(x+2y+2z)}$$

wherein
R is a hydrocarbon,
X is halogen,
$x = 1.0$–2.1,
$y = 0.5$–1.3,
$z = 0.0001$–0.2, and
$4 > (x+2y+2z) > 2$, with a member selected from the group consisting of
(a) a carboxylic acid selected from the group consisting of mono-and divalent aliphatic saturated carboxylic acids, mono- and divalent aliphatic unsaturated carboxylic acids, mono- and divalent aromatic carboxylic acids, chloroacetic acid, thioglycolic acid and anthranilic acid;
(b) a salt of a carboxylic acid of (a);
(c) an anhydride of a carboxylic acid of (a); and
(d) mixtures of (a), (b) and (c) at elevated temperature in the range of about between 40 and 150° C.

5. A process as claimed in claim 4, wherein the reaction is carried out with a carboxylic acid of (a) in the presence of an acid acceptor.

6. A process of preparing organopolysiloxanes having terminal acyloxy groups, which comprises reacting organopolysiloxanes of the general formula $$R_zSiO_y(SO_4)_zX_{4-(x+2y+2z)}$$

wherein
R is a member selected from the group consisting of alkyl of from 1 to 6 carbon atoms, chloropropyl, vinyl, allyl, benzyl, phenyl and chlorophenyl,
X is chlorine,
$x = 1.85$–2.0,
$y = 0.95$–1.15,
$z = 0.0001$–0.1, and
$4 > (x+2y+2z) > 2$ with a member selected from the group consisting of
(a) a carboxylic acid selected from the group consisting of mono- and divalent aliphatic saturated carboxylic acids, mono- and divalent aliphatic unsaturated carboxylic acids, mono- and divalent aromatic carboxylic acids, chloroacetic acid, thioglycolic acid and anthranilic acid;
(b) a salt of a carboxylic acid of a);
(c) an anhydride of a carboxylic acid of (a); and
(d) mixtures of (a), (b) and (c) at elevated temperature in the range of about between 40 and 150° C.

7. A process of preparing organopolysiloxanes of the average formula $$R_zSiO_yOAc_{4-(x+2y)}$$

wherein
R is a member selected from the group consisting of alkyl of from 1 to 6 carbon atoms, chloropropyl, vinyl, allyl, benzyl, phenyl and chlorophenyl;
Ac is derived from a carboxylic acid selected from the group consisting of mono- and divalent aliphatic saturated carboxylic acids, mono- and divalent aliphatic unsaturated carboxylic acids, mono- and divalent aromtaic carboxylic acids, chloroacetic acid, thioglycolic acid and anthranilic acid;
$x = 1.0$–2.1
$y = 0.5$–1.3 and
$4 > (x+2y) > 2$, which comprises reacting at elevated temperature a polysiloxane of the formula $$R_zSiO_y(SO_4)_zX_{4-(x+2y+2z)}$$

wherein R, X, $x$ and $y$ have the above meaning, $z = 0.0001$–2 and $4 > (x+2y+2z) > 2$, with a member selected from the group consisting of
(a) a carboxylic acid selected from the group consisting of mono- and divalent aliphatic saturated carboxylic acids, mono- and divalent aliphatic unsaturated carboxylic acids, mono- and divalent aromatic carboxylic acids, chloroacetic acid, thioglycolic acid and anthranilic acid;
(b) a salt of a carboxylic acid of (a);
(c) an anhydride of a carboxylic acid of (a); and
(d) mixtures of (a), (b) and (c).

8. An equilibrated mixture of compounds of the average formula $$R_zSiO_yOAc_{4-(x+2y)}$$

wherein R is a member selected from the group consisting of alkyl from 1 to 6 carbon atoms, chloropropyl, vinyl, allyl, benzyl, phenyl and chlorophenyl;
Ac is acyl derived from a carboxylic acid of not more than 2 carboxylic groups and selected from the group consisting of mono- and dibasic aliphatic saturated carboxylic acids, mono- and dibasic aliphatic unsaturated carboxylic acids, mono- and dibasic aromatic carboxylic acids, chloroacetic acid, thioglycolic acid and anthranilic acid, $x$ and $y$ being defined by
$x = 1.0$–2.1
$y = 0.5$–1.3 and
$4 > (x+y) > 2$.

9. Compounds as claimed in claim 8, wherein
$x = 1.85$–2.0 and
$y = 0.95$–1.15.

10. An equilibrated mixture of compounds of the average formula $$AcO-\left[\begin{array}{c} R \\ | \\ Si-O- \\ | \\ R \end{array}\right]_r Ac$$

wherein
R is a member selected from the group consisting of alkyl of from 1 to 6 carbon atoms, chloropropyl, vinyl, allyl, benzyl, phenyl and chlorophenyl;
Ac is acyl derived from a carboxylic acid of not more than 2 carboxylic groups and selected from the group consisting of mono- and dibasic aliphatic saturated carboxylic acids, mono- and dibasic aliphatic unsaturated carboxylic acids, mono- and dibasic aromatic carboxylic acids, chloroacetic acid, thioglycolic acid and anthranilic acid; and r is a member having a value between 3 and 100.

11. An equilibrated mixture of compounds of the average formula

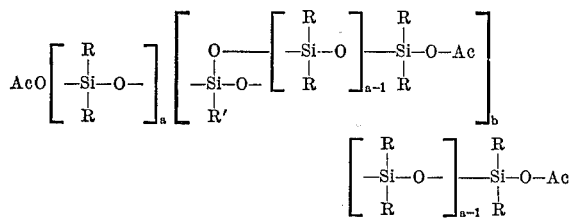

wherein

R is a member selected from the group consisting of alkyl of from 1 to 6 carbon atoms, chloropropyl, vinyl, allyl, benzyl, phenyl and chlorophenyl;

Ac is acyl derived from a carboxylic acid of not more than 2 carboxylic groups and selected from the group consisting of mono- and dibasic aliphatic saturated carboxylic acids, mono- and dibasic aliphatic unsaturated carboxylic acids, mono- and dibasic aromatic crboxylic acids, chloroacetic acid, thioglycolic acid and anthranilic acid;

R′ is hydrocarbon, $a=1-20$, and $b=1-20$.

12. Compounds as claimed in claim 11, wherein R′ is a member selected from the group consisting of methyl, ethyl, vinyl and phenyl.

13. Compounds as claimed in claim 11, wherein $a=3-10$ and $b=1-5$.

14. An equilibrated mixture of compounds of the average formula

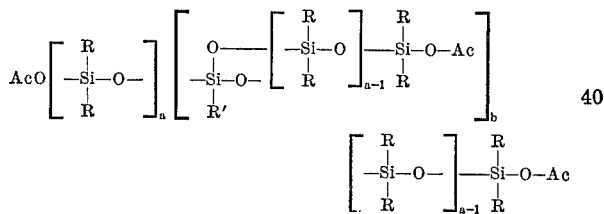

wherein

R is a member selected from the group consisting of alkyl of from 1 to 6 carbon atoms, chloropropyl, vinyl, allyl, benzyl, phenyl and chlorophenyl;

Ac is derived from a carboxylic acid selected from the group consisting of mono- and divalent aliphatic saturated carboxylic acids, mono- and divalent aliphatic unsaturated craboxylic acids, mono- and divalent aromatic carboxylic acids, chloroacetic acid, thioglycolic acid and anthranilic acid;

R′ is a member selected from the group consisting of methyl, ethyl, vinyl and phenyl;

$a=3-10$, and $b=1-5$.

15. An equilibrated mixture of compounds as claimed in claim 8, wherein said carboxylic acid is a saturated aliphatic monocarboxylic acid, and unsaturated aliphatic monocarboxylic acid having a single double bond, an aliphatic dicarboxylic acid or an aromatic dictrboxylic acid.

References Cited

UNITED STATES PATENTS

| | | | |
|---|---|---|---|
| 3,183,254 | 5/1965 | Rossmy et al. | 260—448.2 |
| 3,418,352 | 12/1968 | Rossmy | 260—448.2 |
| 3,356,758 | 12/1967 | Omietanski | 260—448.8XR |

TOBIAS E. LEVOW, Primary Examiner

P. F. SHAVER, Assistant Examiner

U.S. Cl. X.R.

260—46.5R, 448.2R, 448.2E, 448.8R, 18S, 824R, 827R; 2—59R, 70R